United States Patent
Vogric et al.

(10) Patent No.: US 10,201,043 B2
(45) Date of Patent: Feb. 5, 2019

(54) ELECTRIC CIRCUIT FOR ELECTRIC ARC FURNACE

(71) Applicant: Danieli & C. Officine Meccaniche S.p.A., Buttrio (IT)

(72) Inventors: Marko Vogric, Gorizia (IT); Franco Scotti, Monfalcone (IT); Marco Pasut, Feletto Umberto (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 497 days.

(21) Appl. No.: 14/775,589

(22) PCT Filed: Mar. 17, 2014

(86) PCT No.: PCT/IB2014/059892
§ 371 (c)(1),
(2) Date: Sep. 11, 2015

(87) PCT Pub. No.: WO2014/141217
PCT Pub. Date: Sep. 18, 2014

(65) Prior Publication Data
US 2016/0029443 A1    Jan. 28, 2016

(30) Foreign Application Priority Data
Mar. 15, 2013    (IT) .............................. MI2013A0396

(51) Int. Cl.
*H05B 7/11*     (2006.01)
*H05B 7/148*    (2006.01)
(Continued)

(52) U.S. Cl.
CPC .............. *H05B 7/109* (2013.01); *H05B 7/11* (2013.01); *H05B 7/144* (2013.01); *H05B 7/148* (2013.01);
(Continued)

(58) Field of Classification Search
CPC ............ H05B 7/00; H05B 7/005; H05B 7/02; H05B 7/11; H05B 7/20; H05B 7/103;
(Continued)

(56) References Cited

U.S. PATENT DOCUMENTS

| 4,663,764 A | 5/1987 | Bretthauer et al. |
| 5,715,273 A * | 2/1998 | Dratner ................... H05B 7/11 373/103 |
| 5,940,426 A | 8/1999 | Dratner et al. |

FOREIGN PATENT DOCUMENTS

| DE | 3814261 | 11/1989 |
| EP | 0738099 | 10/1996 |

* cited by examiner

*Primary Examiner* — Hung D Nguyen
(74) *Attorney, Agent, or Firm* — Stetina Brunda Garred & Brucker

(57) ABSTRACT

The method for adjusting the impedance of one or more phases of a secondary circuit of an electric furnace, in order to limit the unbalance between the phases themselves comprises the transformer (31), a variable impedance secondary circuit for one or more phases (F1, F2, F3), the rigid and fixed interconnection (32) for each phase (F1, F2, F3) connected to the transformer, the flexible cables (33) connected by means of the proximal end to the fixed interconnection (32), the electrode holding arms (34) connected to the distal end of the flexible cables (33), the conductive electrodes (35) fixed to the respective electrode holding arms (34). The rigid and fixed interconnection (32) of a phase (F1, F2, F3) comprises at least one turn (11), wherein the impedance is either continuously or discreetly variable in order to obtain the desired impedance value.

11 Claims, 2 Drawing Sheets

(51) Int. Cl.
*H05B 7/109* (2006.01)
*H05B 7/144* (2006.01)
*H05B 7/20* (2006.01)

(52) U.S. Cl.
CPC .............. *H05B 7/20* (2013.01); *Y02P 10/256* (2015.11); *Y02P 10/259* (2015.11)

(58) Field of Classification Search
CPC ........ H05B 7/109; H05B 7/144; H05B 7/148; Y02P 10/256; Y02P 10/259
USPC .............. 373/70, 98, 99, 101, 103, 104, 108
See application file for complete search history.

ELECTRIC CIRCUIT FOR ELECTRIC ARC FURNACE

CROSS REFERENCE TO RELATED APPLICATIONS

The present application claims priority to PCT International Application No. PCT/IB2014/059892 filed on Mar. 17, 2014, which application claims priority to Italian Patent Application No. MI2013A000396 filed Mar. 15, 2013, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to an electric circuit for an alternating current electric arc furnace and provides a variation in the geometry of the secondary power circuit of the furnace in order to adjust the impedance of at least one of the phases.

STATE OF THE ART

Arc furnaces are used in iron-working to produce raw materials or alloys, by melting components by heating. The use of arc furnaces for producing steel has increased over the past years. This is due to the increase in the number of operating plants, to their size and above all to the advantages offered by such apparatuses, which are mainly:
 higher achievable temperatures (higher than the temperatures which can be reached in fuel furnaces);
 easy, accurate adjustment of dissipated power;
 very high energy density provided by the electric arc plasma;
 lower economic investments needed for constructing the plant.

The arc furnace is the only universal melting equipment in which today's entire range of steel may be made regardless of the charge materials, from current steel to special higher value steel.

The arc furnaces most used in iron-working may be classified as:
 direct arc (or open arc) furnaces;
 indirect arc (or radiant arc) furnaces, in which the electric arc does not come into contact with the scrap and the heating occurs by radiation;
 resistor (or submerged arc) furnaces, in which the arc is submerged in the molten material.

Direct arc furnaces are the most common in steel production, they reach temperatures higher than 3000° C., have a variable charge capacity from one to three hundred tons, in which (in the case of three-phase furnaces), the arc is formed between three vertical graphite electrodes and the scrap charge or the molten steel bath.

The three electrodes are supplied by a three-phase system, normally at network frequency, in which, from the electrical point of view, the charge, i.e. the material to be melted, is the star centre and each of the three arcs which are established between each electrode and the metal in the insulating refractory pot is the single-phase charge.

In an electric supplying plant of a direct arc furnace according to the prior art, the transformer of the furnace is usually provided with star-delta windings because of the better behavior in case of unbalanced three-phase systems on the secondary. Indeed, the homopolar unbalance current may circulate freely in the secondary winding of the transformer without perturbing the sinusoidal waveform of the voltage; furthermore, the winding reactance is the reactance needed for forming the arc.

Higher electric conductivity makes a more stable arc; indeed, lower conductivity would mean a higher arc resistance, and stability is promoted by a high cathode thermionic power, a low gas ionization potential and a high plasma temperature, which is promoted, in turn, by a low gas conductivity. In all cases, arc length limits, no-load voltage and stabilization resistance values exist in the electric plant which supplies the arc, beyond which the arc is either not formed or is not maintained.

The elements which influence arc stability in alternating current operation are:
 the length of the arc: shorter arcs are more stable (as in direct current systems);
 he atmosphere in which the arc is formed: a more ionisable atmosphere provides a more stable arc (as in direct current systems);
 the current frequency: the arc is more stable at higher frequency because at higher frequencies the $\partial v/\partial t$ is higher and the voltage ramp-up speed after current zero is higher.

This facilitates charge emission from the electrodes and arc reformation. Furthermore, at higher frequencies the favorable effects for arc reformation are also higher due to thermal inertia.

The drawbacks connected to three-phase secondary circuits in alternating current electric arc furnaces are known in the prior art. The secondary power circuit of a furnace is the part of the circuit which goes from the transformer of the furnace to the electric arc. Said part comprises:
 a fixed, rigid connection between the transformer and the flexible cables, which establishes the connection to the phases or the closing of the triangle, according to the secondary connection of the transformer;
 the flexible cables, which establish the fixed connection of the transformer to the electrode holding arms and which allow the vertical movement of the arms themselves in order to vary the vertical position of the electrodes with respect to the furnace;
 electrode holding arms, one for each phase, generally consisting of a rigid crosspiece which can be displaced at least vertically by means of appropriate actuating systems, and carrying, at the ends, the connection to flexible cables on one side and the clamps for locking the respective electrode on the other;
 the consumable electrodes, generally made of graphite from which the electric arc is formed.

The transformer which is used as adjuster to vary the secondary voltage, i.e. the one applied to the circuit in series to the arc, is characterized by:
 strong secondary currents with frequent possibility of short circuit operation (secondary impedance is often very low);
 strong electro-dynamic stresses;
 need to adjust secondary voltage, within rather broad limits, given the high variability of the total equivalent impedance of the downstream circuit under load.

Given the values of the secondary currents and the high voltage reduction ratio, the secondary circuit nearly always consists of a parallel of many single turns or, at least, pairs of turns. The furnace power is adjusted by adjusting the supply voltage and the current intensity in the electrodes.

The voltage is adjusted by means of switching under load achieved nearly always using supplementary sockets on the primary circuit of the transformer.

In electric furnaces, such as for example three-phase furnaces, it is thus necessary to have a secondary circuit which is as balanced as possible, i.e. has an impedance substantially equal in all phases in order to have the same electric power flow and thus no unbalance in circuiting currents. A current unbalance between the various phases of the secondary circuit determines problems of overheating and the creation of hot spots in the furnace, with consequent repercussions on melting process quality and efficiency due to a non-symmetric distribution of the electric arc. A higher circulating current makes this drawback more relevant. In particular, the so-called "wild phase" phenomenon may occur, according to which one of the outer phases is overloaded in case of unbalanced in reactances, while the other is discharged; in addition to other drawbacks concerning the melting quality and efficiency, this causes rapid wear of the refractory material on the overloaded phase side.

Generally, the unbalance between the three phases, which is calculated as described in specific standards (e.g. Italian standard CEI EN 60676), should be lower than 7% but sometimes more stringent limitations are employed, requiring a guaranteed unbalance lower than 3-4%. In all cases, it is worth noting that the unbalance is measured in standard conditions, i.e. with electrode holding arms equipped with new electrodes and secured in clamps so that the clamps are aligned, with length of the electrodes between clamp and tip equal for the three phases. It is normal that the unbalance value in real working conditions is higher, due to manufacturing and/or assembly tolerances of the components, movements of the cables during operation, length of the electrodes which varies over time, height of the arms etc.

Modifying the inductance of one or more phases in order to reduce the unbalance, by modifying the geometry of the phases themselves, is already known in the prior art, e.g. in document EP0738099. According to this patent, the three phases geometry is adjusted on the electrode holding arms, which are however subject to relative movements with respect to each other and to absolute movements according to the height of the electrodes and the step of the process. The fact that the adjustment point of the path is subject to variations implies a variability in the effect of the adjustment itself: a given modification of the path of a phase may have different effects according to the surrounding conditions. Furthermore, the part of the circuit on which the adjustment is made is placed near the oven and thus in a dirty area, sensitive to fumes, which may considerably reduce the working life of the electromechanical parts belonging to the adjustment system.

A second solution for controlling the unbalance of the phases in an arc furnace is suggested in patent application U.S. Pat. No. 5940426 which includes the use of adaptors specifically configured and applied to the furnace electrodes both in case of direct current and alternating current use. Such adaptors in addition to performing a merely supporting action, constitute an auxiliary reactor in the electric power circuit of the furnace. However, the unbalance of the phases may be reduced only in part and furthermore it requires the recalculation and the contingent reconfiguration of the conducting parts contained in each adaptor. This complicates the application conditions and multiplies the costs correlated to such application.

A further device which operates on the secondary circuit of the transformer for controlling the impedance is also described in publication DE3814261A1. The document discloses the use of a movable contact for closing the circuit represented by a turn of predetermined dimensions. This is obtained by fitting the ends of the turn into the supports. Also in this case, the geometry of the circuit is predetermined and invariable, with the consequent impossibility of dynamically operating on the impedance, and thus on the unbalance control of the phases.

However, in all the aforesaid cases, it is not possible to operate on the impedance of the phases during plant operation and the furnace must be stopped.

A further solution of the prior art is described in document U.S. Pat. No. 4,663,764 in which the balancing of the three arcs during operation is sought by attempting to contrast the phase impedance imbalance. This is obtained by moving the electrodes to equalize the lengths of the arcs and operating separately on the three furnace transformer variators to vary at least one of the secondary voltages. Thus, this solution corresponds to an adjustment system of the working point, i.e. a system for electrically balancing the parameters of the three arcs. However, such a solution does not allow to obtain a secondary circuit which is balanced from the electrical point of view.

By varying the secondary power voltages, it is possible to balance the arc parameters better, but this solution also has the disadvantage of needing to use a special transformer with separate tapchangers having separate control. Deriving drawbacks include higher costs and greater complexity, impossibility of using spare transformers which are not equal to the aforesaid special transformer etc.

Additionally, the tapchangers of this solution work continuously, with a very high number of operations equal to normal working operations plus the operations required by the aforesaid adjustments of the electrodes and the variators. This determines a more frequent maintenance of the tapchangers with consequent high costs. The operation with unbalanced three-phase voltages may include an unbalanced operation of the transformer with higher stress or the need to be oversized, e.g. oversized magnetic circuits.

Finally, this solution cannot continuously run the process variables due to the slowness of the tapchangers, thus continuous balancing cannot be achieved.

SUMMARY OF THE INVENTION

It is the object of the present invention to provide a secondary circuit of an electric furnace configured so as to have an impedance which is adjustable in a given manner, i.e. independently from the position of the arms, from the length of the electrodes or from other surrounding factors.

A further object of the present invention is to provide a secondary circuit of an electric furnace which can guarantee unbalances between phases lower than 3%, and tending to 0%.

Another object of the present invention is to provide a secondary circuit in an electric furnace which may maintain a very low unbalance also during plant activity.

Another purpose of the invention is to provide a secondary circuit in an electric furnace which may guarantee the possibility of being applied also to existing plants, i.e. the so-called revamping, in which there may be problems of space between the furnace and the wall of the transformer room, or of pre-existing construction which cannot be modified as desired and with problems of electric unbalance.

These and other objects are reached, according to a first aspect of the invention, by means of a secondary circuit with variable impedance for one or more phases of an electric arc furnace, wherein said secondary circuit is associated to a transformer having output connections and comprise:

(a) a rigid and fixed interconnection for each phase connected to the transformer;

(b) flexible cables connected by means of the end proximal to the fixed interconnection;

(c) electrode holding arms connected to the distal end of the flexible cables;

(d) conductive electrodes fixed to the respective electrode holding arms, wherein the rigid and fixed interconnection of at least one phase comprises at least one turn having adjustable geometry, in which the impedance is either continuously or discretely adjustable in order to obtain the desired impedance value.

The present invention includes an impedance adjustment system of one or more phases of a secondary circuit of an electric furnace, in order to limit unbalance between the phases themselves. The adjustment is carried out by modifying the geometry of at least one turn positioned in a fixed part of the secondary circuit and this guarantees the same effect on the overall impedance, independently from the position of the electrode holding arms, the length of the electrodes or other factors. The adjustment may be carried out on one or more segments of the interconnection circuit. Furthermore, such an adjustment may be carried out in various manners, e.g. by making a turn of variable dimensions or by making a plurality of turns and connecting a number of them suited to the required adjustment or by making a turn which can be inclined for achieving the adjustment.

Said objects are reached, according to a further aspect of the invention, by means of a method for the adaptive adjustment of the impedance in a secondary circuit as described above. The method comprises the following steps of:

(i) calculating the phase impedance needed to obtain a predetermined unbalance value;

(ii) determining the correspondence between the required impedance and the adjustment of the geometry of the turn and consequently fixing the turn;

(iii) measuring the phase impedances and calculating the unbalance;

(iv) adjusting the turn on the basis of the unbalance value in order to obtain the corresponding impedance variation;

(v) again measuring the phase impedances and recalculating the unbalance;

(vi) repeating steps (i)-(v) up to reach the unbalance value closest to the required value.

As explained in greater detail below, the adaptive adjustment of impedance by means of the method of the present invention may by achieved also during the operation of the arc furnace and not necessarily with the furnace off.

According to the invention, it is also possible to adjust the arc parameters with the advantages of having totally normal transformers and adjustment systems without needing to use a special transformer with separate tapchangers having separate control.

The dependent claims describe preferred embodiments of the invention.

BRIEF DESCRIPTION OF THE FIGURES

The present invention will now be described in greater detail with reference to the figures which are provided by way of non-limiting examples of embodiment of the present invention. They show.

DETAILED DESCRIPTION OF PREFERRED EMBODIMENTS OF THE INVENTION

Figure 1:
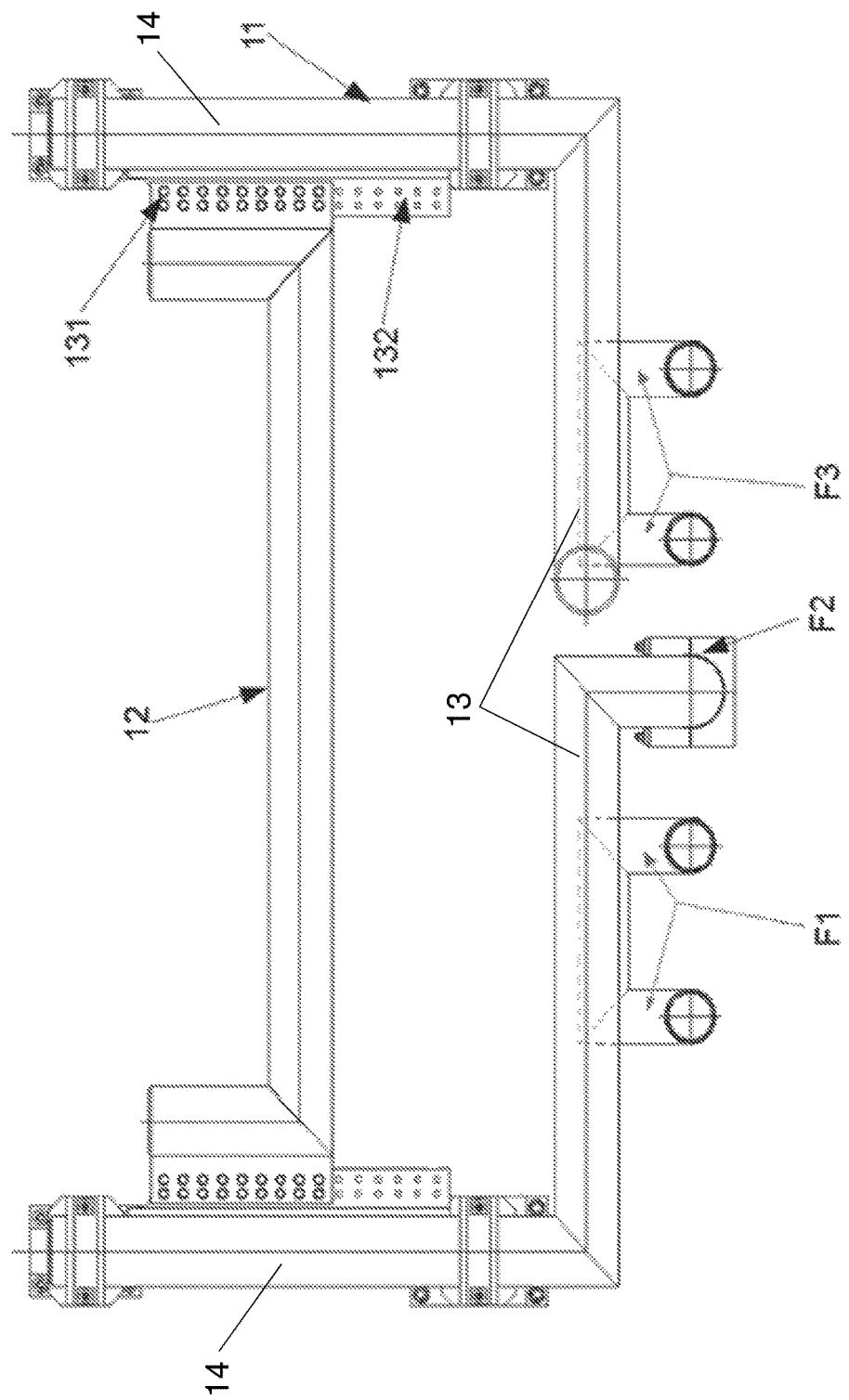
FIG. 1: a front view of a turn of a furnace according to the present invention, in which the upper side consists of a movable crosspiece.
Figure 2:
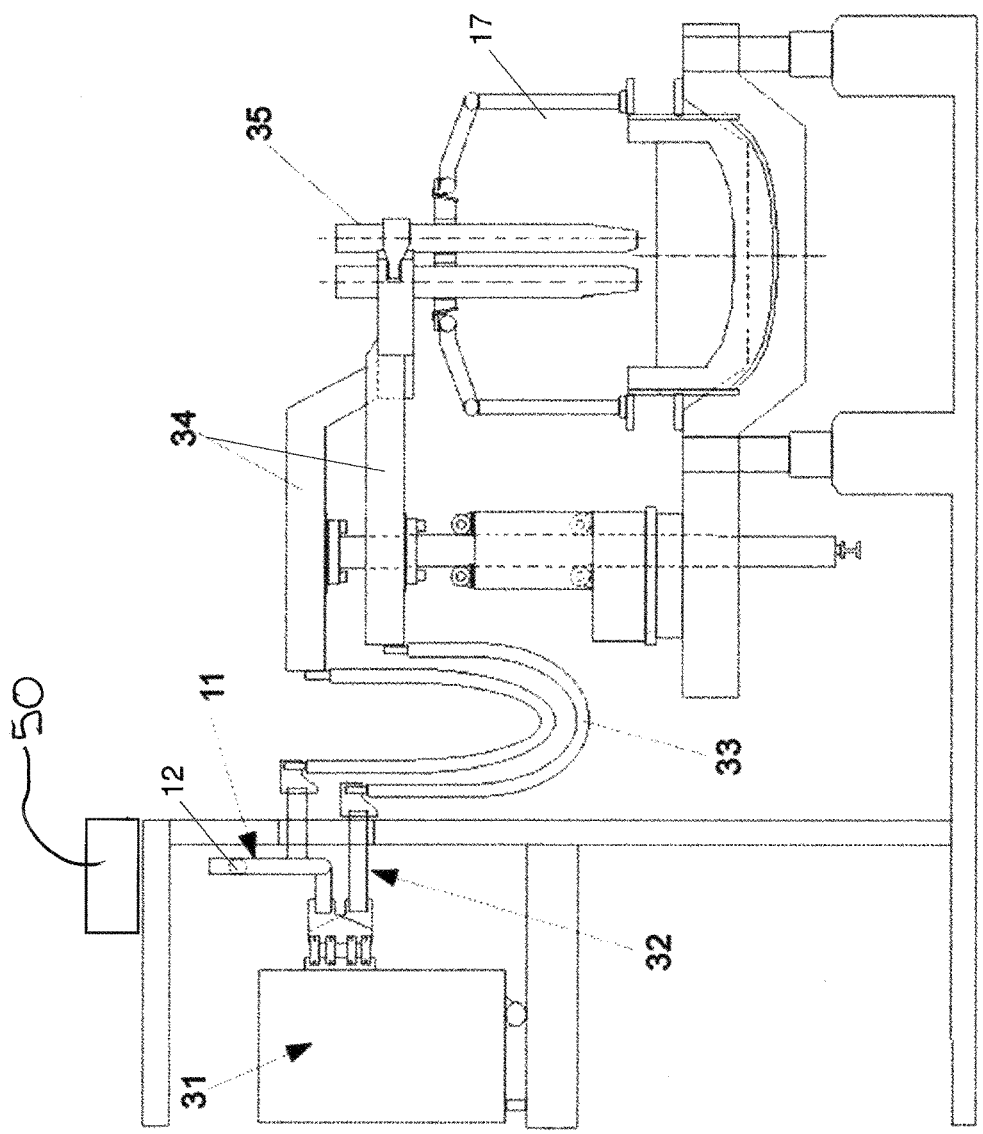
FIG. 2: a diagram of an arc furnace in which the positions of the components constituting the secondary circuit object of the present invention are highlighted.

As shown in FIGS. 1 and 2, the components and the respective connections of a secondary circuit of an electric arc furnace provide the direct connection of a transformer 31 to one or more phases F1-F3 of the circuit. These phases are, in turn, connected by means of flexible cables 33 to supporting arms 34 for the electrodes 35 placed inside the melting chamber of the furnace 17. The interconnection modes between the transformer 31 and the phases F1-F3 and between said phases F1-F3, the flexible cables 33 and the electrodes 35 are crucial for controlling the resulting impedance of the system.

In the embodiment according to the invention shown in FIG. 1, a substantially quadrangular turn 11 is provided, the upper side of which, or crosspiece 12, can be adjusted in height. By virtue of side fixing elements, the crosspiece 12 may be placed in different positions. The orientation of the crosspiece 12 with respect to the rest of the turn 11 is not binding and thus the crosspiece 12 may be turned, for example upwards 180° with respect to that shown in FIG. 1 so as to raise it further and with a consequent expansion of the width of the turn 11, in direction of the height (observing FIG. 1). Indeed, by varying the position of the crosspiece 12 and thus the extension of the turn 11, it is possible to adjust the overall impedance of the respective phase: by raising the position of the crosspiece, the extension of the turn is increased, thus increasing the impedance of the secondary circuit to which it belongs, vice versa by lowering the crosspiece it is possible to decrease the impedance of the secondary circuit.

The contact between the movable crosspiece 12 and the sides 14 of the turn 11, along which it may slide or be displaced, occurs along flanges 131, 132, which are at least partially complementary to each other, where the flanges 131, 132 are preferably in the form of perforated sheets or sliding contacts. The system comprises specific fixing elements for locking the movable crosspiece 12 at a predetermined distance from the lower side 13 of the turn 11, opposite to the upper side or crosspiece 12.

In the present embodiment, the turn 11 is placed orthogonally to the circuits of the other phases F1, F2 and F3: this allows to minimize interactions with them. In the embodiment shown in FIG. 1, the adjustment is achieved in a discrete interval of points given by the position of the fixing elements, such as bolts, for example, between the crosspiece 12 and the sides 14 of the turn 11. In a second embodiment, it is also possible to provide a continuous adjustment range, e.g. by using sliding contacts which allow a finer adjustment, precisely by being able to fix the crosspiece 12 to the sides 14 of the turn 11 in a continuous range of points. By virtue of the present invention, it is possible to guarantee an unbalance between phases also lower than 3-4% because it is possible to find the optimal position of the crosspiece 12, which allows to have an unbalance very close to zero.

In a second embodiment of the invention, the turn 11, instead of having a movable crosspiece 12, is characterized in that it can be inclined: the orientation of the turn 11 is adjustable to exploit the variations of the mutual inductances between the various component circuits of the system and varying in this manner the impedance of the phase of the turn 11.

In a third embodiment of the invention, the impedance of the phase of the turn 11 is adjustable either by moving the movable crosspiece 12 or by inclining the turn 11.

By means of the system of the invention, it is possible to make plants with very low unbalances. Furthermore, the respective impedance setup phase may be carried out continuously, during plant operation. The method may also be carried out after the first furnace startup or after changing the parts which may modify the secondary circuit, such as for example the electrode holding arms. The continuous adjustment of the impedance of the phases, i.e. during the entire process without needing to stop the oven, can be achieved by using, for example, sliding contacts or by varying the orientation or the inclination of the turn 11, it being possible to carry out these adjustments by means, for example, of actuators, such as hydraulic cylinders or other types of actuators. The latter are applicable also in the case of discrete adjustment.

The adjustment system of the present invention may be advantageously but not mandatorily placed inside the transformer room as shown in FIG. 2, so as to preserve the apparatus and its most delicate components from the steelwork environment, from fumes and dust. Furthermore, in this position it is possible to avoid hindrances near the furnace and allow a better accessibility to the adjustment instrument.

The adjustment method of the invention is described below. Firstly, the phase impedance of the phases is calculated for the system and the spaces, so that as to obtain the required unbalance (e.g. <4%). Subsequently, the correspondence is found between the impedance required for the required unbalance and the position of the crosspiece, wherein each position corresponds to a known, different impedance and the crosspiece is fixed in the established position. After this, the impedances Z of the phases are measured and the unbalance is calculated by means of the following relationship:

$$Z_{AS\%} = (Z_{max} - Z_{min})/Z_{avg}$$

wherein:
$Z_{max}$ is the maximum phase impedance
$Z_{min}$ is the minimum phase impedance and
$Z_{avg}$ is the arithmetical average of all the phase impedances.

If a control system 50 of the furnace detects that the unbalance $Z_{As}$ % is too high, the position of the crosspiece of the turn is adjusted so as to reduce the unbalance: in the embodiment shown in FIG. 1, the crosspiece is thus either raised to increase the impedance of the respective phase or lowered to decrease the impedance.

Afterwards, the impedances Z of the phases are measured again and the value of the unbalance $Z_{AS\%}$ is recalculated. This sequence of steps of adjusting is repeated until the unbalance value closest as possible to zero or in all cases to the required value is reached.

The invention claimed is:

1. An electric arc furnace comprising a transformer having output connections, a secondary circuit with variable impedance for one or more phases F1, F2, F3, comprising:
   (a) a rigid and fixed interconnection for each phase F1, F2, F3 connected to the transformer, the rigid and fixed interconnection of at least one phase F1, F2, F3 including at least one turn having a geometry adjustable either continuously or discretely to adjust the impedance in order to obtain a desired impedance value and a first side of said turn consists of a movable crosspiece configured so that a distance between said movable crosspiece and a second side of the turn, opposite to said first side, is variable;
   (b) flexible cables each connected through a respective first end thereof to the rigid and fixed interconnection;
   (c) electrode holding arms each connected to a respective second end of the flexible cables;
   (d) conductive electrodes fixed to the respective electrode holding arms.

2. An electric arc furnace according to claim 1, wherein the contact between the movable crosspiece and third sides of the turn, along which said movable crosspiece slides, occurs along flanges which are at least partially complementary to one another.

3. An electric arc furnace according to claim 2, wherein said flanges are shaped as perforated sheets or sliding contacts.

4. An electric arc furnace according to claim 1, comprising fixing elements for locking the movable crosspiece at a predetermined distance from the second side of the turn.

5. An electric arc furnace according to claim 4, wherein said fixing elements are inserted in corresponding perforations of the flanges.

6. An electric arc furnace according to claim 1, wherein the turn is placed orthogonally with respect to the secondary circuit of each phase F1, F2, F3.

7. An electric furnace according to claim 1, wherein the turn can be inclined with respect to its orthogonal axis.

8. A method for adjusting an electric arc furnace having a transformer having output connections, a secondary circuit with variable impedance for one or more phases F1, F2, F3, comprising: (a) a rigid and fixed interconnection for each phase F1, F2, F3 connected to the transformer, the rigid and fixed interconnection of at least one phase F1, F2, F3 including at least one turn having a geometry adjustable either continuously or discretely to adjust the impedance in order to obtain a desired impedance value and a first side of said turn consists of a movable crosspiece configured so that a distance between said movable crosspiece and a second side of the turn, opposite to said first side, is variable; (b) flexible cables each connected through a respective first end thereof to the rigid and fixed interconnection; (c) electrode holding arms each connected to a respective second end of the flexible cables; (d) conductive electrodes fixed to the respective electrode holding arms, comprising the following steps:
   (i) calculating, on a control system, the impedance of the phases needed to obtain a predetermined unbalance value;
   (ii) determining, on the control system, a correspondence between the needed calculated impedance and the geometry of the turn and consequently fixing the turn;
   (iii) measuring the impedances of the phases and calculating an unbalance on the control system;
   (iv) adjusting the turn on the basis of the unbalance value in order to obtain a corresponding impedance variation;
   (v) again measuring the impedances of the phases and recalculating the unbalance on the control system;
   (vi) repeating steps (i) - (v) up to reaching the unbalance closest to the predetermined unbalance value,
   wherein the unbalance ZAs % is calculated according to a relationship $$Z_{AS\%} = (M_{max} - Z_{min})/Z_{avg}$$

wherein:

$Z_{max}$ is a maximum phase impedance $Z_{min}$ is a minimum phase impedance and $Z_{avg}$ is an arithmetical average of all the phase impedances.

9. A method according to claim 8, wherein the impedance is adjusted by modifying a position of a first side of said turn, constituted by a moveable crosspiece, with respect to a second side opposite to the first side.

10. A method according to claim 8, wherein the impedance is adjusted by modifying, an inclination of the turn.

11. A method according to claim 8, wherein an adaptive adjustment of the impedance occurs during an operation of the electric arc furnace.

* * * * *